United States Patent
Tachibana (10) Patent No.: US 11,150,912 B2
(45) Date of Patent: Oct. 19, 2021

(54) APPARATUS, METHOD AND PROGRAM FOR LEGACY BOOT PROCESSING

(71) Applicant: FUJITSU LIMITED, Kawasaki (JP)

(72) Inventor: Masazumi Tachibana, Chiba (JP)

(73) Assignee: FUJITSU LIMITED, Kawasaki (JP)

( * ) Notice: Subject to any disclaimer, the term of this patent is extended or adjusted under 35 U.S.C. 154(b) by 182 days.

(21) Appl. No.: 16/524,407

(22) Filed: Jul. 29, 2019

(65) Prior Publication Data

US 2020/0050463 A1 Feb. 13, 2020

(30) Foreign Application Priority Data

Aug. 7, 2018 (JP) .............................. JP2018-148530

(51) Int. Cl.
| | | |
|---|---|---|
| *G06F 9/4401* | (2018.01) | |
| *G06F 12/10* | (2016.01) | |
| *G06F 13/14* | (2006.01) | |
| *G06F 12/06* | (2006.01) | |

(52) U.S. Cl.
CPC ............ *G06F 9/4408* (2013.01); *G06F 9/441* (2013.01); *G06F 12/06* (2013.01); *G06F 12/10* (2013.01); *G06F 13/14* (2013.01); *G06F 2213/0026* (2013.01)

(58) Field of Classification Search
CPC .. G06F 9/4408; G06F 9/441; G06F 2212/206; G06F 2212/1044; G06F 2212/1032; G06F 2213/0026; G06F 12/0653; G06F 12/06; G06F 12/10; G06F 13/14
See application file for complete search history.

(56) References Cited

U.S. PATENT DOCUMENTS

| | | | |
|---|---|---|---|
| 5,737,542 A | 4/1998 | Kurihara et al. | |
| 6,769,059 B1 * | 7/2004 | Qureshi | G06F 8/65 713/2 |
| 7,979,592 B1 * | 7/2011 | Pettey | G06F 13/404 710/3 |
| 2006/0041710 A1 * | 2/2006 | Silva | G06F 9/4411 711/102 |
| 2007/0233928 A1 * | 10/2007 | Gough | G06F 9/4413 710/301 |

(Continued)

FOREIGN PATENT DOCUMENTS

| | | |
|---|---|---|
| JP | 6-139182 | 5/1994 |
| JP | 9-114768 | 5/1997 |

*Primary Examiner* — Raymond N Phan
(74) *Attorney, Agent, or Firm* — Fujitsu Patent Center (57) ABSTRACT

An apparatus includes a plurality of root ports serving as roots of bus connection of a plurality of devices including boot devices from which legacy boot is executed to boot an operating system (OS). A processor included in the apparatus identifies a single boot device among the boot devices and a single root port connected to the single boot device, and allocates, as memory addresses to be used for memory mapped input and output, memory addresses with a bit width available during the legacy boot to devices connected to the identified single root port. The processor determines whether the memory addresses have been allocated to all devices connected to the single root port, and executes the legacy boot to boot the OS from the single boot device when the memory addresses have been allocated to all the devices connected to the single root port.

9 Claims, 10 Drawing Sheets (56) References Cited

U.S. PATENT DOCUMENTS

| | | | | |
|---|---|---|---|---|
| 2012/0047309 A1* | 2/2012 | Natu | ................. | G06F 21/85 |
| | | | | 710/314 |
| 2015/0006780 A1* | 1/2015 | Shao | ................. | G06F 13/4221 |
| | | | | 710/316 |
| 2015/0293873 A1* | 10/2015 | Shao | ................. | G06F 13/4045 |
| | | | | 710/314 |
| 2016/0378509 A1* | 12/2016 | Venkatasubba | ........ | G06F 9/50 |
| | | | | 713/2 |
| 2017/0185346 A1* | 6/2017 | Niell | ................. | G06F 12/0284 |
| 2017/0255582 A1* | 9/2017 | Harriman | ............ | G06F 13/4221 |
| 2018/0349188 A1* | 12/2018 | Beckett | ................. | G06F 9/50 |
| 2019/0042281 A1* | 2/2019 | Raghav | ............. | G06F 13/4282 |
| 2019/0171505 A1* | 6/2019 | Nachimuthu | ....... | G06F 9/45558 |
| 2019/0339986 A1* | 11/2019 | Khatri | ................. | G06F 8/61 |
| 2019/0369703 A1* | 12/2019 | Tan | ................. | G06F 3/0634 |

* cited by examiner

|  | REQUESTED MMIO SIZE | NUMBER OF CARDS |
|---|---|---|
| FC CARD OR RAID CARD (BOOT DEVICE) | 16 MB | 4 |
| IB CARD | 64 MB | 20 |
| LAN CARD | 8 MB | 24 |

APPARATUS, METHOD AND PROGRAM FOR LEGACY BOOT PROCESSING

CROSS-REFERENCE TO RELATED APPLICATION

This application is based upon and claims the benefit of priority of the prior Japanese Patent Application No. 2018-148530, filed on Aug. 7, 2018, the entire contents of which are incorporated herein by reference.

FIELD

The embodiment relates to effective allocation of areas for memory mapped input and output in boot processing.

BACKGROUND

In recent years, the transition to Unified Extensible Firmware Interface (UEFI) boot that activates an operating system (OS) in a UEFI mode is in progress. However, legacy boot that activates the OS in a basic input output system (BIOS) mode is used with an old software asset or the like in some cases.

The BIOS has two activation modes, legacy boot and UEFI boot. Normally, the UEFI boot is valid, and the legacy boot is set to be valid depending on settings. In the legacy boot, the BIOS accesses only an address space (4 gigabytes (GB) of 0 to 0xFFFFFFFF) of 32 bits due to compatibility with old hardware. After the activation of the OS, the BIOS may access an address space of 64 bits.

In order to activate the OS from a Peripheral Component Interconnect (PCI) device in the legacy boot, the BIOS executes (1) the allocation of memory mapped input and output (MMIO) requested by the PCI device to an address space and (2) a legacy boot option read only memory (ROM) program stored in the PCI device.

MMIO is input and output (IC)) of a device that are executed using a memory address allocated to the device. The option ROM program is a driver to be used to read the OS from the device.

A region that is included in an address space managed by the BIOS and is used to allocate MMIO to an address space of 32 bits is indicated by MMIO-Low (L). In addition, a region that is included in the address space managed by the BIOS and is used to allocate the MMIO to an address space of 64 bits is indicated by MMIO-High (H). The BIOS allocates the MMIO requested by the PCI device to the MMIO-L or the MMIO-H. However, since the legacy boot option ROM program is executed before the activation of the OS, the BIOS accesses an address space of up to 32 bits. Thus, the BIOS allocates MMIO requested by a legacy boot PCI device to the MMIO-L.

Figure 12:
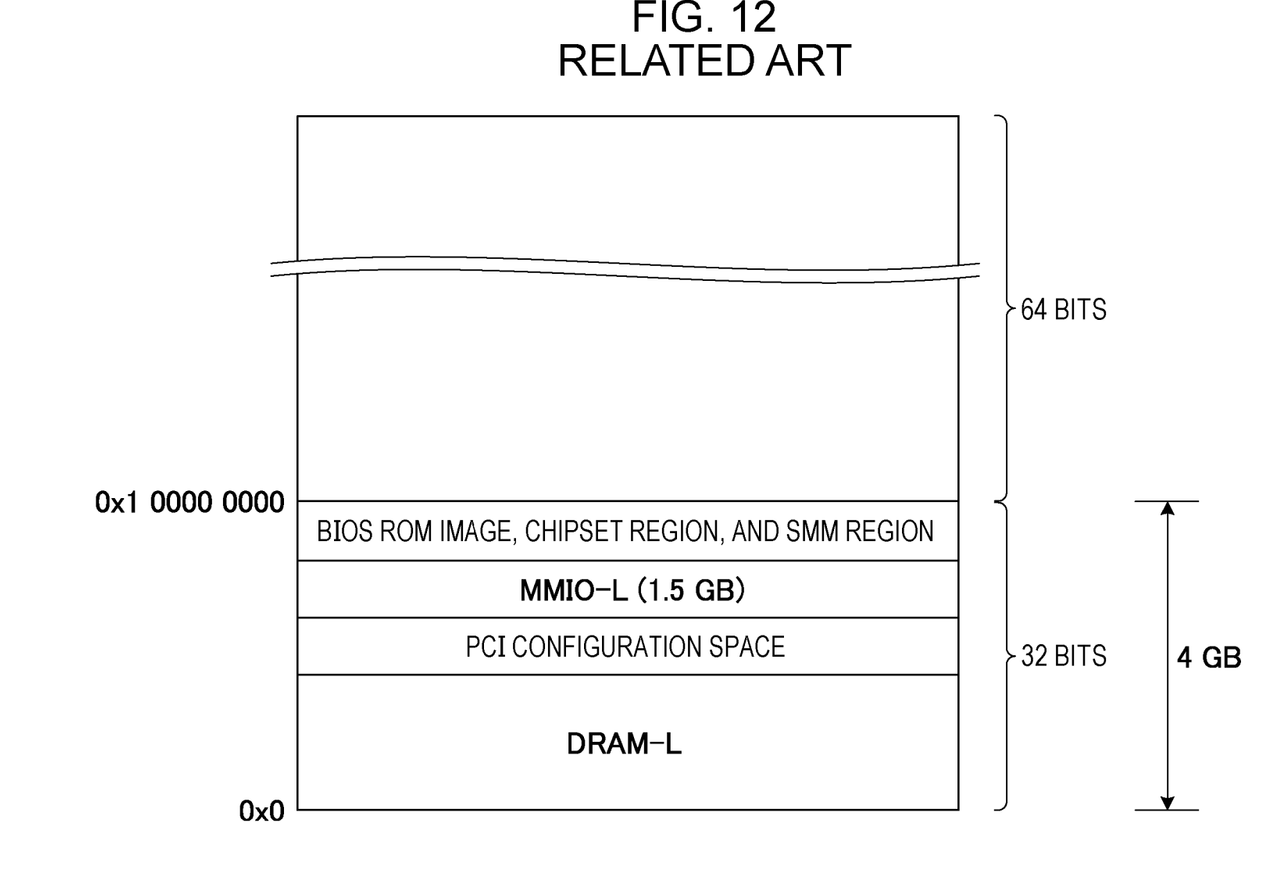
FIG. 12 is a diagram illustrating an address space managed by a BIOS.

FIG. 12 is a diagram illustrating the address space managed by the BIOS. As illustrated in FIG. 12, the address space of 32 bits is used as dynamic random access memory (DRAM)-L, a configuration, the MMIO-L, a BIOS ROM image, a chipset region, and a system management mode (SMM) region. Thus, the size of the region used as the MMIO-L is approximately 1.5 GB.

A recent PCI device requests MMIO of 32 megabytes (MB), 64 MB, or the like, and the MMIO-L may be insufficient. A PCI device to which the MMIO-L is not allocated is not used after the activation of the OS. While the MMIO-L may be allocated to a legacy boot PCI device, the MMIO-H may be allocated to a non-legacy boot PCI device. In PCI, the MMIO-L or the MMIO-H is allocated per root port. A root port is a port serving as a root for connection of multiple devices via a PCI bus. A server system includes multiple root ports. A PCI device with the MMIO-L allocated thereto and a PCI device with the MMIO-H allocated thereto are not connected to a single root port.

As a related technique related to the BIOS, there is a technique for enabling the use of a system BIOS having a program size twice the size of a related-art program. In this technique, an IRT routine and a BIOS driver group that constitute the system BIOS are stored in different 64-byte blocks of a BIOS ROM. Before the activation of the OS, the IRT routine is allocated to F0000 to FFFFF of a memory address space. After the activation of the OS, the BIOS driver group is allocated F0000 to FFFFF of the memory address space.

In addition, there is a technique for recognizing the size of an address space occupied by extension boards attached to three slots and setting, in a mapping table based on the result of the recognition, an association relationship between an address of a computer and a slot selection signal to select any of the three slots. According to this technique, the address space occupied by the extension boards may be adaptively allocated.

Examples of related art are Japanese Laid-open Patent Publication No. 9-114768 and Japanese Laid-open Patent Publication No. 6-139182.

SUMMARY

According to an aspect of the embodiments, an apparatus includes a plurality of root ports serving as roots of bus connection of a plurality of devices including boot devices from which legacy boot is executed to boot an operating system (OS). A processor included in the apparatus identifies a single boot device among the boot devices and a single root port connected to the single boot device, and allocates, as memory addresses to be used for memory mapped input and output, memory addresses with a bit width available during the legacy boot to devices connected to the identified single root port. The processor determines whether the memory addresses have been allocated to all devices connected to the single root port, and executes the legacy boot to boot the OS from the single boot device when the memory addresses have been allocated to all the devices connected to the single root port.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

According to PCI, the MMIO-L or the MMIO-H is allocated per root port. It is, thus, considered that the MMIO-L is allocated to all PCI devices that include a legacy boot PCI device and are under root ports and that the MMIO-H is allocated to all PCI devices under remaining root ports. By executing this allocation, the number of PCI devices to which the MMIO-L is allocated may be reduced.

In a server system with a redundant configuration, however, legacy boot PCI devices are installed under root ports in order to inhibit an OS from being disabled and to be activated from a PCI device. When any of the root ports is able to be used, the OS is able to be activated from a PCI device by installing the legacy boot PCI devices under the root ports. Thus, each of the root ports has a legacy boot PCI device, and MMIO-L is allocated to all the PCI devices. Thus, in the server system with the redundant configuration, the number of PCI devices to which the MMIO-L is allocated is not reduced and the MMIO-L may be insufficient.

It is preferable to avoid the insufficiency of the MMIO-L.

Hereinafter, an embodiment of an information processing device, a boot method, and a boot program is described with reference to the accompanying drawings. The embodiment does not limit techniques disclosed herein.

Embodiment

Figure 1:
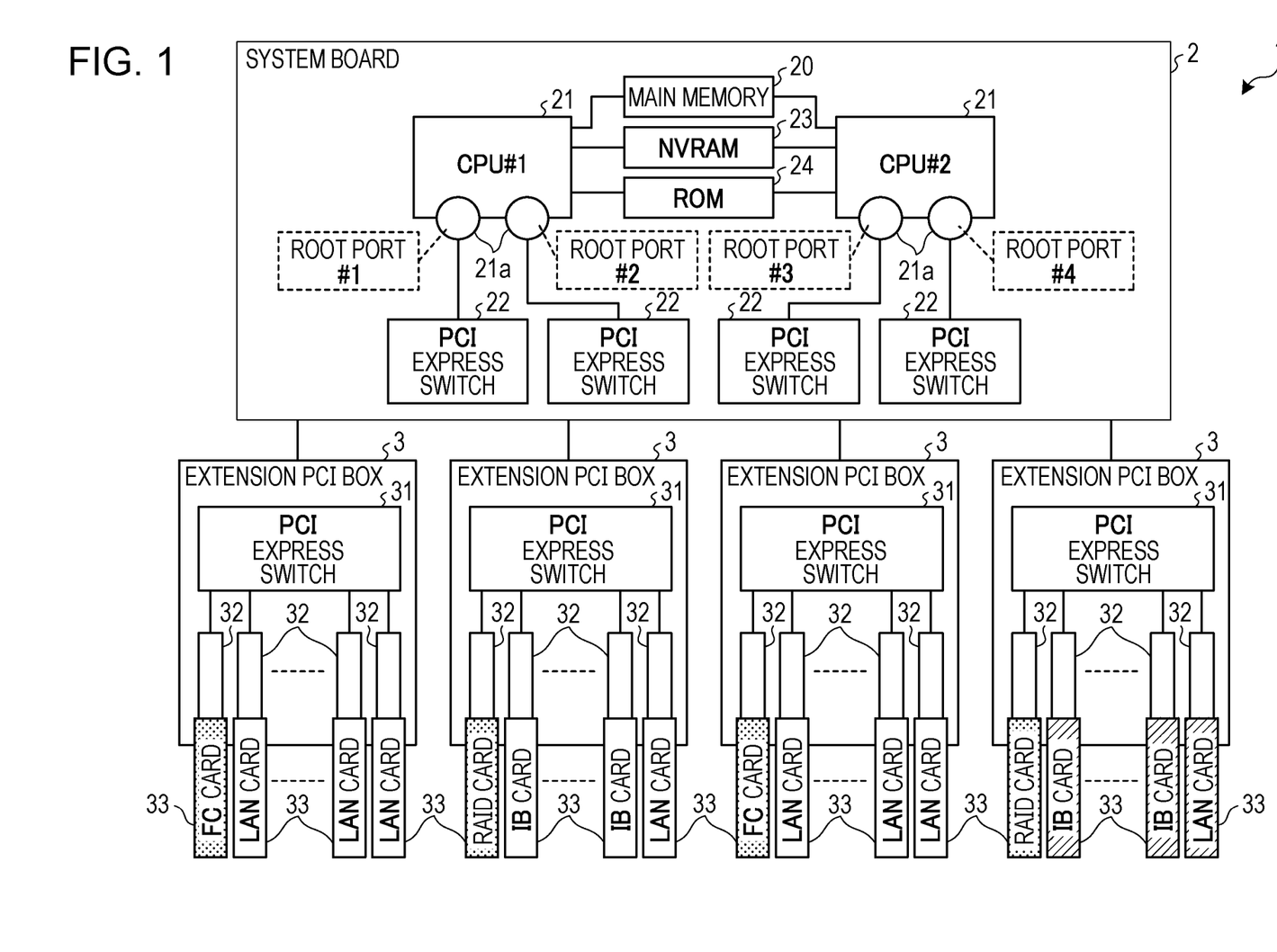
FIG. 1 is a diagram illustrating a configuration of a server system according to an embodiment.

First, a configuration of a server system according to the embodiment is described below. FIG. 1 is a diagram illustrating the configuration of the server system according to the embodiment. As illustrated in FIG. 1, the server system 1 according to the embodiment includes a system board 2 and four extension PCI boxes 3. The four extension PCI boxes 3 are illustrated for the purpose of convenience. As far as the number of extension PCI boxes 3 is 2 or more, the number of extension PCI boxes 3 may be smaller than 4 or larger than 4.

The system board 2 has a main memory 20, two central processing units (CPUs) 21 indicated by CPUs #1 and #2, four PCI express switches 22, a nonvolatile RAM (NVRAM) 23, and a ROM 24. The server system 1 includes four root ports 21*a* indicated by root ports #1 to #4. The four PCI express switches 22, the four root ports 21*a*, and the four extension PCI boxes 3 are associated with each other. Each of the CPUs 21 is associated with two root ports 21*a*.

The system board 2 may have three or more CPUs 21. The system board 2 may have two or three PCI express switches 22 or may have five or more PCI express switches 22. Each of the CPUs 21 may be associated with one root port 21*a* or may be associated with three or more root ports 21*a*.

The main memory 20 stores a program to be executed by the CPUs 21 and intermediate results of executing the program. The CPUs 21 read the program from the main memory 20 and execute the program. The PCI express switches 22 connect the extension PCI boxes 3 to the CPUs 21. The NVRAM 23 stores boot management information registered in a boot management table. The boot management table is described later.

The ROM 24 stores a BIOS. When the server system 1 is turned on, the CPUs 21 read the BIOS from the ROM 24 and cause the BIOS to be stored in the main memory 20. Then, the CPUs 21 read the BIOS from the main memory 20 and execute the BIOS.

The BIOS may be stored in a CD-R, read from the CD-R, and stored in the main memory 20. The CD-R is an example of a recording medium readable by the CPUs 21. Alternatively, the BIOS may be stored in a database or the like of another server system connected via a local area network (LAN) interface to the server system 1 and may be read from the database or the like and stored in the main memory 20.

Each of the extension PCI boxes 3 includes a PCI express switch 31 and twelve slots 32. Each of the extension PCI boxes 3 may include one or more and eleven or less slots 32 or may include thirteen or more slots 32. The PCI express switches 31 are connected to the PCI express switches 22 associated with the PCI express switches 31. PCI devices 33 are attached to the slots 32.

The PCI devices 33 are fiber channel (FC) cards, LAN cards, redundant arrays of inexpensive disks (RAID) cards, and InfiniBand (IB) cards. One FC card and eleven LAN cards are attached to each of two of the extension PCI boxes 3, while one RAID card, ten IB cards, and one LAN card are attached to each of the other two extension PCI boxes 3.

The LAN cards execute communication using a LAN. The IB cards execute communication using IB. The FC cards and the RAID cards are used for legacy boot and store an option ROM program and an OS. In a normal state, one of the FC cards is used for the legacy boot with the highest priority, and the other FC card is used for the legacy boot with the second highest priority. While one of the RAID cards is used as a preliminary legacy boot card, the other RAID card is used as a legacy boot card for disaster recovery.

Figure 2:
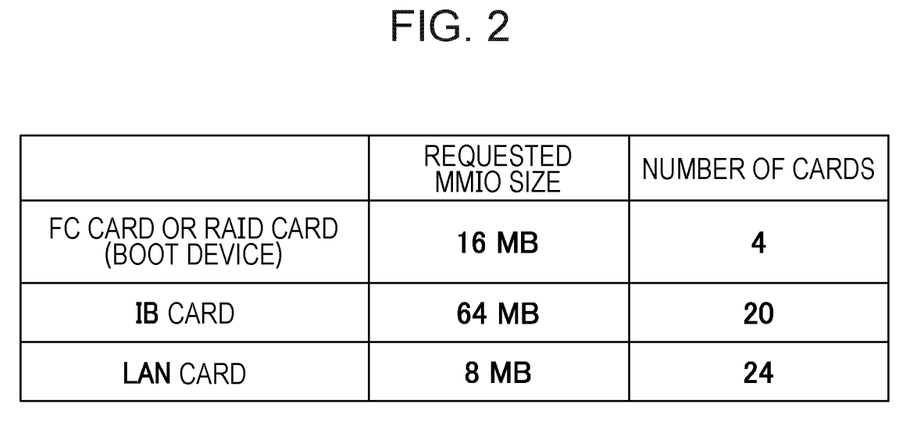
FIG. 2 is a diagram illustrating an example of requested MMIO sizes.

FIG. 2 is a diagram illustrating an example of requested MMIO sizes. As illustrated in FIG. 2, MMIO sizes requested by the FC cards and RAID cards are 16 MB. MMIO sizes requested by the IB cards are 64 MB. MMIO sizes requested by the LAN cards are 8 MB.

A total MMIO size requested by all the PCI devices 33 is 16 MB×4+64 MB×20+8 MB×24=64 MB+1280 MB+192 MB=1536 MB. In addition, an MMIO size requested by an onboard video graphics array (VGA) is 32 MB, an MMIO size requested by an onboard LAN is 1 MB, and an MMIO size requested by a chipset device is 16 MB. Thus, an MMIO size requested by the server system 1 is 1536 MB+32 MB+1 MB+16 MB=1585 MB.

Figure 3:
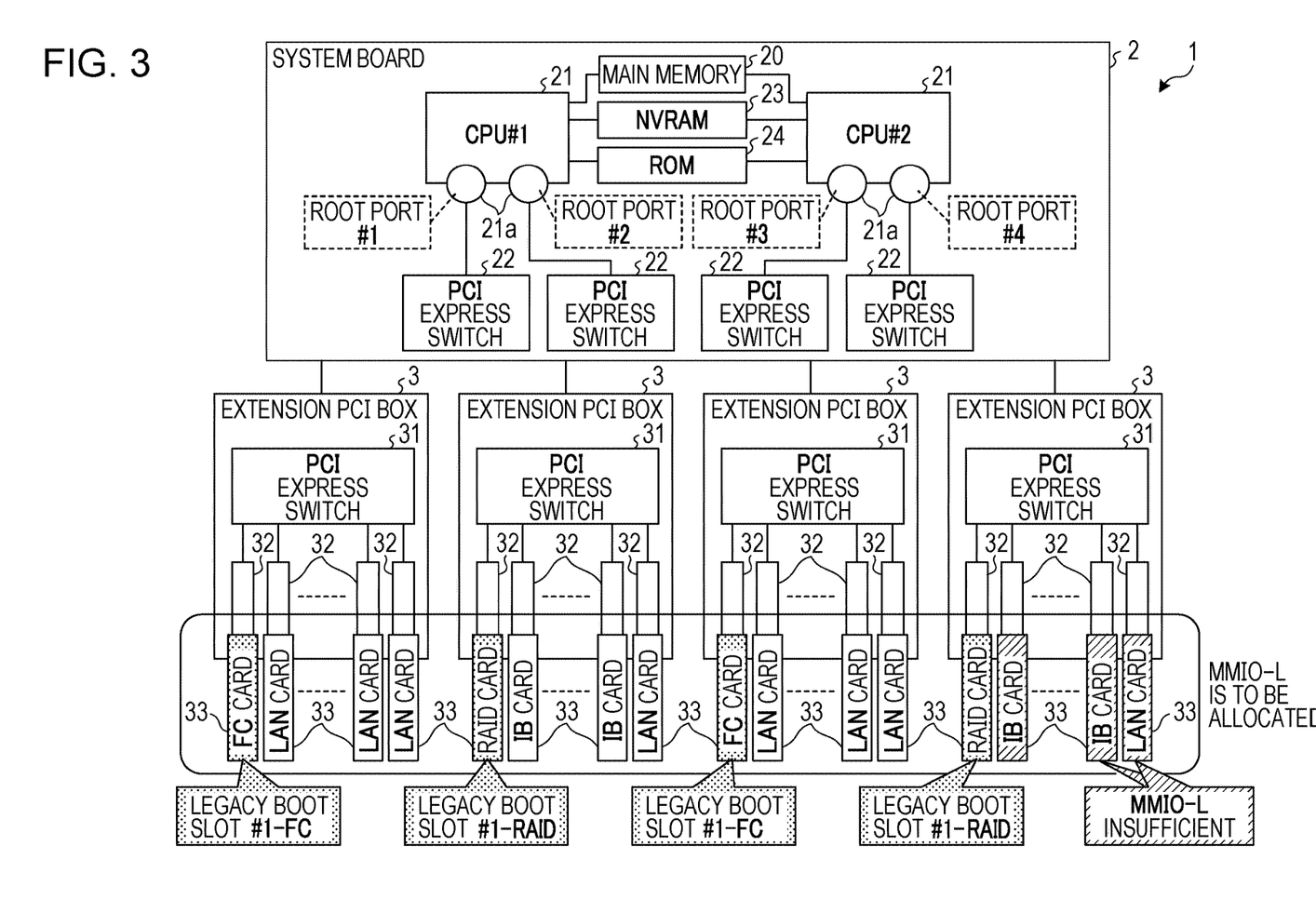
FIG. 3 is a diagram describing insufficiency of MMIO-L.

When an address space allocatable as MMIO-L is 1536 MB, the address space is insufficient by 49 MB (=1585 MB−1536 MB). Since address spaces are allocated to the chipset device, the onboard device, and the PCI devices 33 in this order, the MMIO-L to be allocated to the PCI devices 33 may be insufficient. FIG. 3 is a diagram describing the insufficiency of the MMIO-L. As illustrated in FIG. 3, the MMIO-L is insufficient for one IB card and one LAN card.

The BIOS of the server system 1 uses a boot management table to identify a legacy boot PCI device 33 and a root port 21*a*, allocates the MMIO-L to only the identified root port 21*a*, and allocates the MMIO-H to the other root ports 21*a*.

Figure 4:
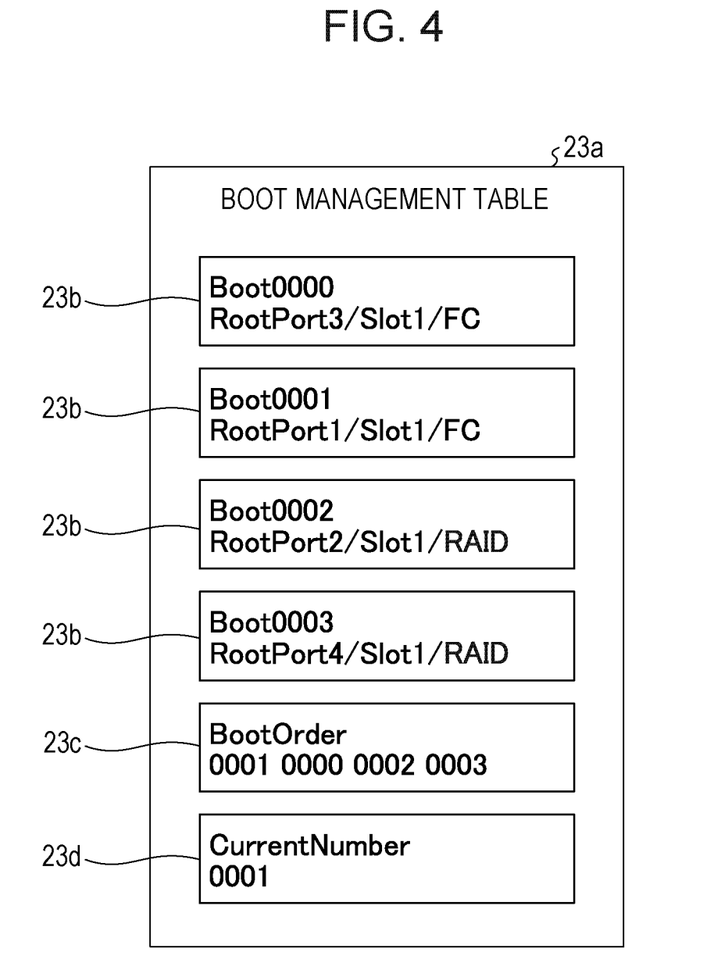
FIG. 4 is a diagram illustrating an example of a boot management table.

FIG. 4 is a diagram illustrating an example of the boot management table. As illustrated in FIG. 4, a boot management table 23a includes four boot device definitions 23b indicated by Boot0000 to Boot0003, a boot order 23c indicated by BootOrder, and a current number 23d indicated by CurrentNumber.

The boot device definitions 23b define legacy boot PCI devices 33 based on UEFI device paths. The boot device definitions 23b include numbers of the root ports 21a to which the legacy boot PCI devices 33 are connected. For example, a device path "RootPort3/Slot1/FC" of Boot0000 defines that an FC card attached to a slot #1 of a root port #3 is a legacy boot PCI device 33. XXXX of BootXXXX (X is a number in a range of 0 to 9) is a boot device definition number identifying a boot device definition 23b.

The boot order 23c defines priorities of the legacy boot PCI devices 33. "0001 0000 0002 0003" of the boot order 23c defines that the PCI devices 33 are used for the activation in the order of Boot0001, Boot0000, Boot0002, and Boot0003. The size of the boot order 23c is 8 bytes. The boot device definitions 23b and the boot order 23c are defined by settings by an administrator of the server system 1.

The current number 23d indicates a boot device definition number to be used for the legacy boot. "0001" of the current number 23d indicates that a boot device definition 23d to be used for the legacy boot is Boot0001. The size of the current number 23d is 2 bytes.

In this manner, the BIOS of the server system 1 uses the current number 23d of the boot management table 23a and the boot device definitions 23b to identify the legacy boot PCI devices 33 and the root ports 21a. The BIOS of the server system 1 uses the boot order 23c to identify the priorities of the legacy boot PCI devices 33.

Figure 5:
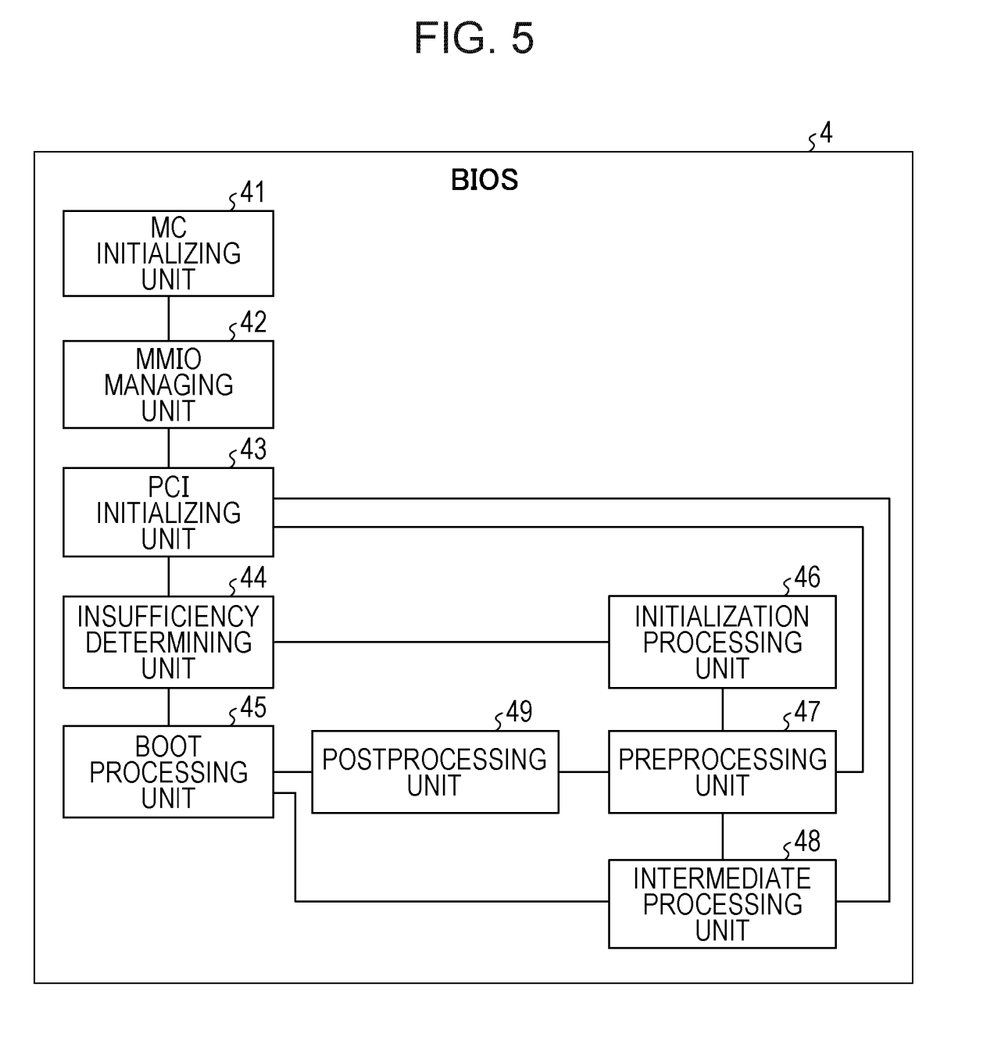
FIG. 5 is a diagram illustrating a functional configuration of a BIOS of the server system.

Next, a functional configuration of the BIOS of the server system 1 is described. FIG. 5 is a diagram illustrating the functional configuration of the BIOS of the server system 1. As illustrated in FIG. 5, the BIOS 4 of the server system 1 includes an MC initializing unit 41, an MMIO managing unit 42, a PCI initializing unit 43, an insufficiency determining unit 44, a boot processing unit 45, an initialization processing unit 46, a preprocessing unit 47, an intermediate processing unit 48, and a postprocessing unit 49.

The MC initializing unit 41, the MMIO managing unit 42, the PCI initializing unit 43, and the boot processing unit 45 are functions included in a related-art BIOS. The insufficiency determining unit 44, the initialization processing unit 46, the preprocessing unit 47, the intermediate processing unit 48, and the postprocessing unit 49 are functions added to the BIOS 4 according to the embodiment.

The MC initializing unit 41 initializes the main memory 20 and a chipset. The MMIO managing unit 42 manages data of the root ports 21a. The MMIO managing unit 42 manages whether the MMIO-L or the MMIO-H is allocated to each of the root ports 21a. In the case where the legacy boot is executed, the MMIO managing unit 42 configures settings to allocate the MMIO-L to all the PCI devices 33.

The PCI initializing unit 43 executes MMIO allocation based on the settings of the MMIO managing unit 42 or settings of the preprocessing unit 47 and executes an initialization processing function of the option ROM program. Upon the MMIO allocation by the PCI initializing unit 43, the MMIO-L may be insufficient and may not be allocated to a PCI device 33.

The boot processing unit 45 boots the OS. For example, the boot processing unit 45 reads the option ROM program from a legacy boot PCI device 33 into the main memory 20 and executes the option ROM program. The option ROM program is executed by reading the OS from a PCI device 33 into the main memory 20.

The insufficiency determining unit 44 determines whether the MMIO-L has been allocated to all the PCI devices 33 without insufficiency of the MMIO-L. When the insufficiency determining unit 44 determines that the MMIO-L has been allocated to all the PCI devices 33, the boot processing unit 45 boots the OS. When the MMIO-L is insufficient, the BIOS 4 identifies a legacy boot PCI device 33 and a root port 21a and allocates the MMIO-L to only a PCI device 33 under the identified root port 21a.

The initialization processing unit 46 initially sets the current number 23d. For example, the initialization processing unit 46 acquires a boot device definition number with the highest priority from the boot order 23c and sets the acquired number to the current number 23d.

The preprocessing unit 47 identifies a root port 21a from a boot device definition 23b indicated by the current number 23d. Then, the preprocessing unit 47 calculates the size of the MMIO-L to be allocated to the identified root port 21a. For example, the preprocessing unit 47 calculates 1487 MB=1536 MB−49 MB. In this case, 1536 MB is the size of an address space allocatable as the MMIO-L, and 49 MB is the size of an MMIO-L space for the chipset and an onboard. Then, the preprocessing unit 47 configures settings to allocate the MMIO-L to a PCI device 33 under the identified root port 21a and allocate the MMIO-H to PCI devices 33 under the other root ports 21a.

Then, the preprocessing unit 47 resets settings of all the PCI devices 33 by executing the following two processes. As the first process, the preprocessing unit 47 executes PCI secondary bus reset to delete an already allocated MMIO resource and clear settings of the PCI devices 33. As the second process, the preprocessing unit 47 initializes a memory region in which the option ROM program has been loaded, a memory region for setting the option ROM program, and data of the BIOS 4 so that the initialization processing function of the option ROM program is able to be re-executed. For example, the preprocessing unit 47 initializes a BIOS data area (BDA) and an interrupt vector table (IVT).

Figure 7:
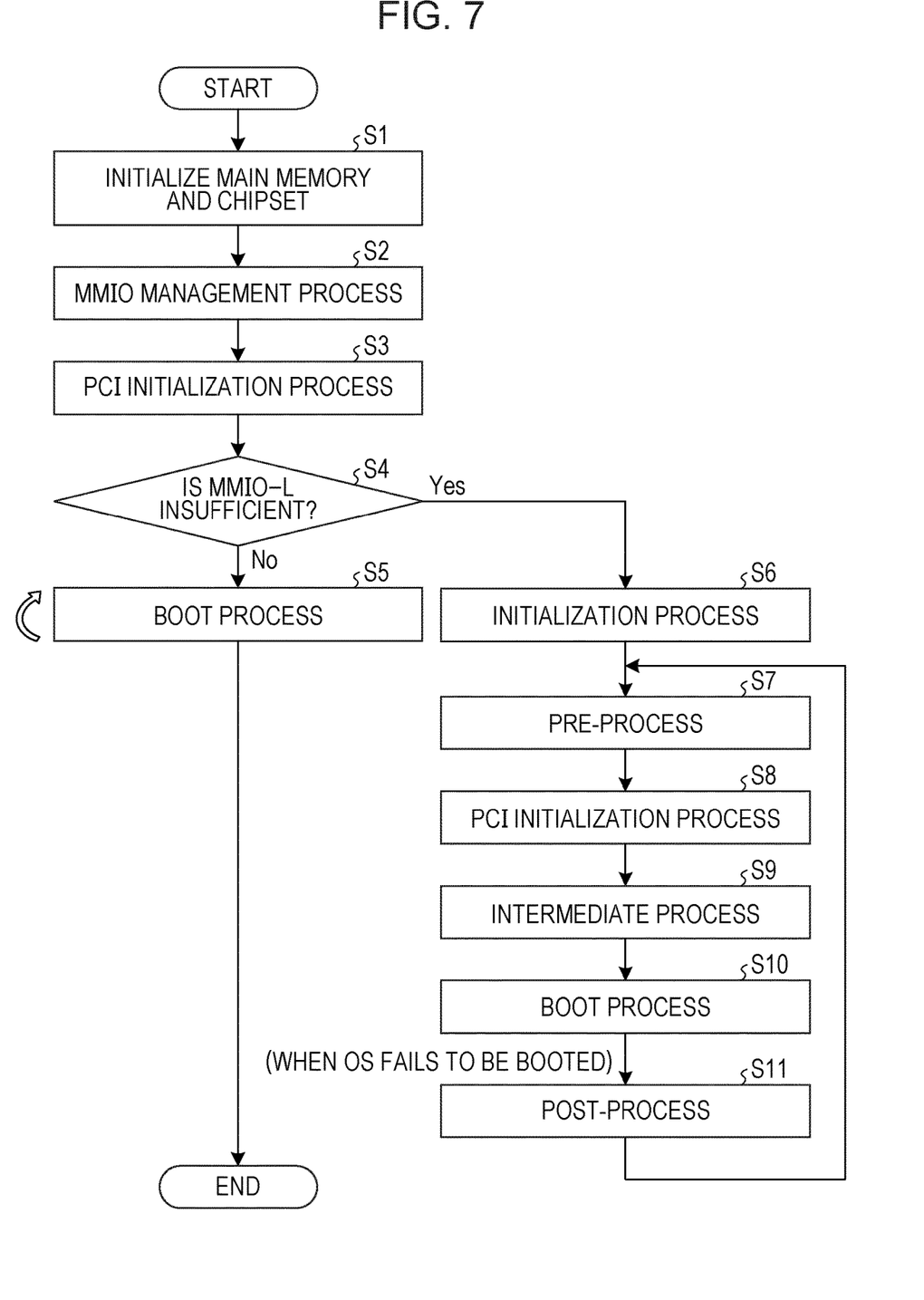
FIG. 7 is a flowchart of a process to be executed by the BIOS.

As illustrated in FIG. 7 described later, before the preprocessing unit 47 executes a pre-process, the PCI initializing unit 43 executes the MMIO allocation and executes the option ROM program. Thus, the preprocessing unit 47 resets the settings of all the PCI devices 33.

The intermediate processing unit 48 makes an inquiry to the PCI initializing unit 43 to determine whether the MMIO-L is insufficient in the MMIO allocation executed by the PCI initializing unit 43 based on setting by the preprocessing 47. When the MMIO-L is insufficient, the intermediate processing unit 48 executes an abnormality process. For example, the intermediate processing unit 48 uses an event log or the like to notify the insufficiency to the administrator of the server system 1. The administrator of the server system 1 changes the configuration or settings such as reinstallation, removal, or the like of the PCI devices 33 to avoid the insufficiency of the MMIO-L. When the MMIO-L is sufficient, the intermediate processing unit 48 requests the boot processing unit 45 to boot the OS.

The postprocessing unit 49 functions when the OS fails to be booted by the boot processing unit 45. The postprocessing unit 49 searches for the boot order 23c of the boot management table 23a based on the current number 23d, acquires a boot device definition number following the current number 23d, and updates the current number 23d. Then, the postprocessing unit 49 passes control to the preprocessing unit 47.

When the boot device definition number following the current number 23d is not acquired, all legacy boot PCI devices 33 are already tried, and the postprocessing unit 49 activates a BIOS setup menu and requests the administrator of the server system 1 to perform an operation. For example, the administrator of the server system 1 resets the legacy boot PCI devices 33.

Figure 6:
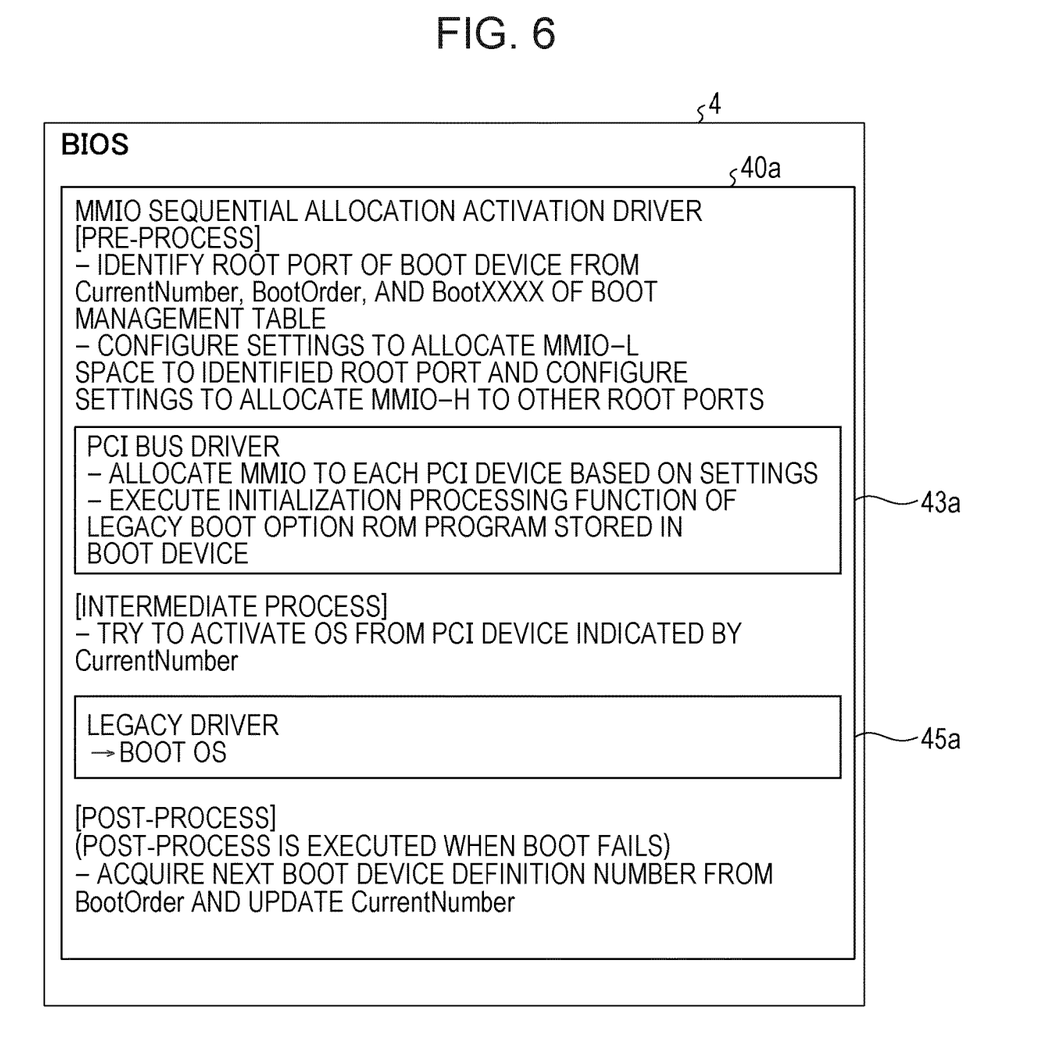
FIG. 6 is a diagram describing an MMIO sequential allocation activation driver.

Functions of the preprocessing unit 47, the intermediate processing unit 48, and the postprocessing unit 49 are enabled by the MMIO sequential allocation activation driver. FIG. 6 is a diagram describing the MMIO sequential allocation activation driver. As described in FIG. 6, the BIOS 4 includes an MMIO sequential allocation activation driver 40a, a PCI bus driver 43a, and a legacy driver 45a. The PCI bus driver 43a enables functions of the PCI initializing unit 43. The legacy driver 45a enables functions of the boot processing unit 45. A pre-process illustrated in FIG. 6 corresponds to a process by the preprocessing unit 47. An intermediate process illustrated in FIG. 6 corresponds to a process by the intermediate processing unit 48. A postprocess illustrated in FIG. 6 corresponds to a process by the postprocessing unit 49.

The MMIO sequential allocation activation driver 40a identifies a root port 21a of a boot device from CurrentNumber, BootOrder, and BootXXXX of the boot management table 23a as the pre-process. In this case, the boot device is a legacy boot PCI device 33. The MMIO sequential allocation activation driver 40a configures settings to allocate the MMIO-L space to the identified root port 21a and allocate the MMIO-H to the other root ports 21a.

Then, the PCI bus driver 43a allocates the MMIO to the PCI devices 33 based on the settings and executes the initialization processing function of the option ROM program included in the boot device.

Then, the MMIO sequential allocation activation driver 40a tries to activate the OS from a PCI device 33 indicated by CurrentNumber as the intermediate process. Then, the legacy driver 45a boots the OS. When the OS fails to be booted, the MMIO sequential allocation activation driver 40a acquires a next boot device definition number from BootOrder and updates CurrentNumber. Then, the MMIO sequential allocation activation driver 40a returns to the pre-process.

Next, a process to be executed by the BIOS 4 is described. FIG. 7 is a flowchart of the process to be executed by the BIOS 4. As illustrated in FIG. 7, when the server system 1 is turned on, the BIOS 4 causes the MC initializing unit 41 to initialize the main memory 20 and the chipset (in step S1) and causes the MMIO managing unit 42 to execute an MMIO management process (in step S2). In the case where the legacy boot is executed, the MMIO managing unit 42 configures the settings to allocate the MMIO-L to all the PCI devices 33 in the MMIO management process.

Then, the BIOS 4 causes the PCI initializing unit 43 to execute a PCI initialization process (in step S3). In the case where the legacy boot is executed and the MMIO managing unit 42 configures the settings to allocate the MMIO-L to all the PCI devices 33, the PCI initializing unit 43 allocates the MMIO-L to all the PCI devices 33 in the PCI initialization process.

Then, the BIOS 4 causes the insufficiency determining unit 44 to determine whether the MMIO-L is insufficient (in step S4). When the MMIO-L is sufficient, the BIOS 4 causes the boot processing unit 45 to execute a boot process (in step S5). The boot processing unit 45 boots the OS in the boot process.

When the MMIO-L is insufficient, the BIOS 4 causes the initialization processing unit 46 to execute an initialization process (in step S6). In the initialization process, the initialization processing unit 46 sets a boot device definition number with the highest priority to the current number 23d. Then, the BIOS 4 causes the preprocessing unit 47 to execute the pre-process (in step S7). In the pre-process, the preprocessing unit 47 identifies a root port 21a to which the MMIO-L is to be allocated, and the preprocessing unit 47 configures settings to allocate the MMIO-L to a PCI device 33 under the identified root port 21a.

Then, the BIOS 4 causes the PCI initializing unit 43 to execute the PCI initialization process (in step S8). In the case where the preprocessing unit 47 configures the settings, the PCI initializing unit 43 allocates the MMIO-L to only the PCI device 33 under the root port 21a identified in the pre-process in the PCI initialization process.

Then, the BIOS 4 causes the intermediate processing unit 48 to execute the intermediate process (in step S9). In the intermediate process, the intermediate processing unit 48 determines whether the MMIO-L is insufficient. In the intermediate process, when the MMIO-L is sufficient, the intermediate processing unit 48 requests the boot processing unit 45 to execute the boot process. Then, the BIOS 4 causes the boot processing unit 45 to execute the boot process (in step S10).

When the OS fails to be booted, the BIOS 4 causes the postprocessing unit 49 to execute the post-process (in step S11). In the post-process, the postprocessing unit 49 sets a boot device definition number with the next highest priority to the current number 23d and passes control to the preprocessing unit 47.

In this manner, the BIOS 4 allocates the MMIO-L to all the PCI devices 33. When the MMIO-L is insufficient, the BIOS 4 identifies a root port 21a to which the MMIO-L is to be allocated, and the BIOS 4 allocates the MMIO-L to only a PCI device 33 under the identified root port 21a. Thus, the BIOS 4 may reduce the number of PCI devices 33 to which the MMIO-L is allocated.

Figure 8:
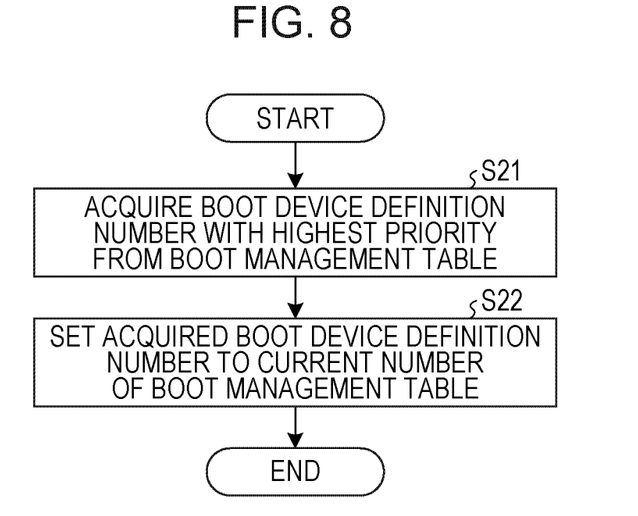
FIG. 8 is a flowchart of an initialization process by an initialization processing unit.

Next, the initialization process to be executed by the initialization processing unit 46 is described. FIG. 8 is a flowchart of the initialization process to be executed by the initialization processing unit 46. As illustrated in FIG. 8, the initialization processing unit 46 acquires a boot device definition number with the highest priority from the boot management table 23a (in step S21) and sets the acquired boot device definition number to the current number 23d of the boot management table 23a (in step S22).

Since the initialization processing unit 46 sets the boot device definition number with the highest priority to the current number 23d, the preprocessing unit 47 identifies, based on the current number 23d, a root port 21a to which the MMIO-L is to be allocated.

Figure 9:
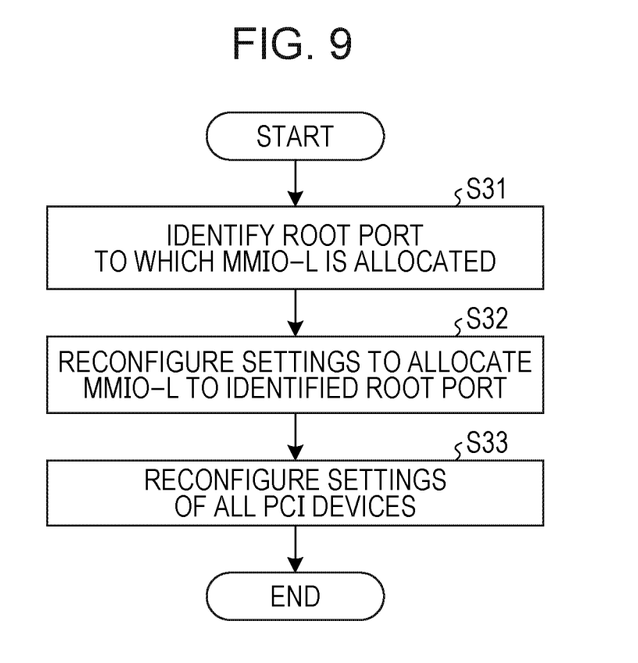
FIG. 9 is a flowchart of a pre-process by a preprocessing unit.

Next, the pre-process to be executed by the preprocessing unit 47 is described. FIG. 9 is a flowchart of the pre-process to be executed by the preprocessing unit 47. As illustrated in FIG. 9, the preprocessing unit 47 identifies a root port 21a to which the MMIO-L is to be allocated (in step S31). Then, the preprocessing unit 47 reconfigures settings to allocate the MMIO-L to the identified root port 21a (in step S32). Then, the preprocessing unit 47 resets settings of all the PCI devices 33 (in step S33). After that, the MMIO allocation is executed based on the settings configured by the preprocessing unit 47.

In this manner, the preprocessing unit 47 identifies a root port 21a to which the MMIO-L is to be allocated. Then, the preprocessing unit 47 reconfigures settings to allocate the MMIO-L to the identified root port 21*a*. Thus, the PCI initializing unit 43 may allocate the MMIO-L to only a PCI device 33 under the identified root port 21*a*.

Figure 10:
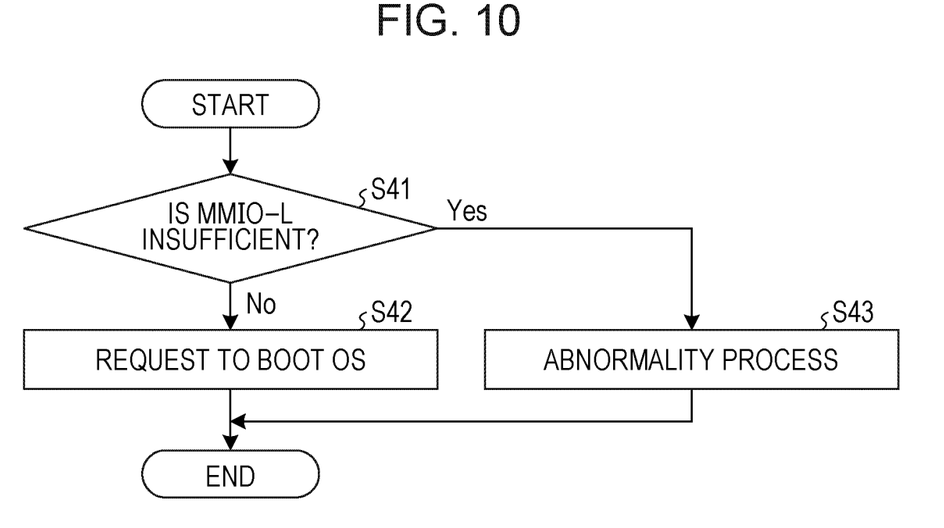
FIG. 10 is a flowchart of an intermediate process by an intermediate processing unit.

Next, the intermediate process to be executed by the intermediate processing unit 48 is described. FIG. 10 is a flowchart of the intermediate process to be executed by the intermediate preprocessing unit 48. As illustrated in FIG. 10, the intermediate processing unit 48 determines whether the MMIO-L is insufficient (in step S41). When the MMIO-L is sufficient, the intermediate processing unit 48 requests the boot processing unit 45 to boot the OS (in step S42). When the MMIO-L is insufficient, the intermediate processing unit 48 executes the abnormality process (in step S43).

When the MMIO-L is sufficient, the intermediate processing unit 48 requests the boot processing unit 45 to boot the OS. Thus, the server system 1 may execute the legacy boot.

Figure 11:
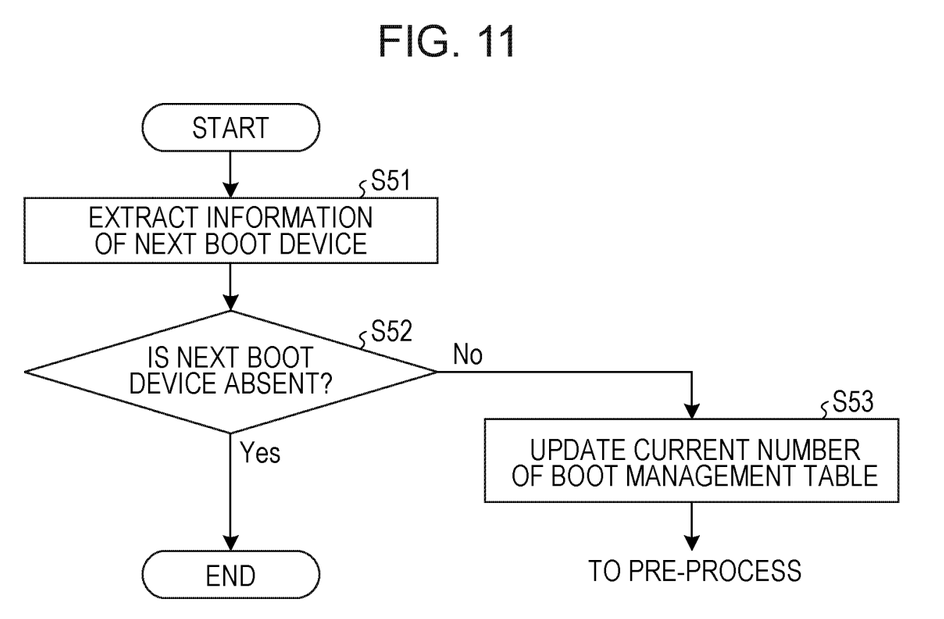
FIG. 11 is a flowchart of a post-process by a postprocessing unit.

Next, the post-process to be executed by the postprocessing unit 49 is described. FIG. 11 is a flowchart of the post-process to be executed by the postprocessing unit 49. As illustrated in FIG. 11, the postprocessing unit 49 extracts information of a next boot device (in step S51) and determines whether the next boot device does not exist (in step S52). When the next boot device does not exist, the postprocessing unit 49 terminates the post-process. When the next boot device exists, the postprocessing unit 49 updates the current number 23*d* of the boot management table 23*a* (in step S53) and passes control to the preprocessing unit 47.

Since the postprocessing unit 49 updates the current number 23*d* in the aforementioned manner, the BIOS 4 may use a boot device with the next highest priority to boot the OS.

As described above, in the embodiment, the preprocessing unit 47 identifies a root port 21*a* to which the MMIO-L is to be allocated, and the preprocessing unit 47 configures settings to allocate the MMIO-L to a PCI device 33 under the identified root port 21*a*. Then, the PCI initializing unit 43 allocates the MMIO-L to a PCI device 33 under the root port 21*a* identified by the preprocessing unit 47 and allocates the MMIO-H to PCI devices 33 under the other root ports 21*a*. Then, the intermediate processing unit 48 determines whether the MMIO-L is insufficient. When the MMIO-L is sufficient, the intermediate processing unit 48 requests the boot processing unit 45 to execute the boot process. Then, the boot processing unit 45 boots the OS. Thus, the BIOS 4 may reduce the number of PCI devices 33 to which the MMIO-L is allocated. The BIOS 4 may suppress the occurrence of the insufficiency of the MMIO-L.

In the embodiment, when the boot processing unit 45 fails to boot the OS, the postprocessing unit 49 sets a boot device definition number with the next highest priority to the current number 23*d* of the boot management table 23*a* and passes control to the preprocessing unit 47. Then, the processes are repeatedly executed by the preprocessing 47, the PCI initializing unit 43, the intermediate processing unit 48, the boot processing unit 45, and the postprocessing unit 49. Thus, the server system 1 may reduce the probability that the OS fails to be booted.

In the embodiment, in the case where the legacy boot is executed, the MMIO managing unit 42 configures the settings to allocate the MMIO-L to all the PCI devices 33 and the PCI initializing unit 43 allocates the MMIO-L to all the PCI devices 33. Then, the insufficiency determining unit 44 determines whether the MMIO-L is insufficient. When the MMIO-L is insufficient, the BIOS 4 executes a process of allocating the MMIO-L to only a PCI device 33 under an identified root port 21*a*. When the MMIO-L is sufficient, the BIOS 4 immediately boots the OS. Thus, in the case where the number of PCI devices 33 is not sufficient to cause the insufficiency of the MMIO-L in the server system 1, the BIOS 4 may boot the OS at high speed.

In the embodiment, the boot management table 23*a* includes the boot device definitions 23*b*, the boot order 23*c*, and the current number 23*d*, and the preprocessing unit 47 uses the boot management table 23*a* to identify a root port 21*a* to which the MMIO-L is to be allocated. Thus, the preprocessing unit 47 may simply identify a root port 21*a* to which the MMIO-L is to be allocated.

The embodiment describes the case where the boot devices are PCI devices 33. The boot devices, however, may be devices connected to a bus other than the PCI bus.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing apparatus comprising:
   a plurality of root ports serving as roots of bus connection of a plurality of devices including boot devices from which legacy boot is executed to boot an operating system (OS); and
   a processor configured to perform a process including:
   identifying a single boot device among the boot devices and a single root port connected to the single boot device,
   allocating, as memory addresses to be used for memory mapped input and output, memory addresses with a bit width available during the legacy boot to devices connected to the identified single root port,
   determining whether the memory addresses have been allocated to all devices connected to the single root port, and
   executing the legacy boot to boot the OS from the single boot device when the memory addresses have been allocated to all the devices connected to the single root port, wherein
   when the legacy boot of the OS fails, the processor performs the process on another boot device among the boot devices.

2. The information processing apparatus of claim 1, wherein:
   the processor is further configured to:
   determine whether memory addresses with the bit width have been allocated to all devices included in the information processing apparatus when the information processing apparatus is turned on, and
   identify the single root port when there exists a device to which a memory address with the bit width has not been allocated.

3. The information processing apparatus of claim 1, further comprising:
   a memory configured to store boot management information including information of the plurality of root ports, information defining the boot devices, and information indicating priorities of the boot devices, wherein
   the processor identifies the single root port, based on the boot management information.

4. The information processing apparatus of claim 1, wherein the devices are PCI devices.

5. The information processing apparatus of claim 1, wherein the plurality of devices are arranged such that at least one boot device is connected to each of the plurality of root ports.

6. A method performed by an information processing apparatus including a plurality of root ports serving as roots of bus connection of a plurality of devices including boot devices from which legacy boot is executed to boot an operating system (OS), the method comprising:
- identifying a single boot device among the boot devices and a single root port connected to the single boot device,
- allocating, as memory addresses to be used for memory mapped input and output, memory addresses with a bit width available during the legacy boot to devices connected to the identified single root port,
- determining whether the memory addresses have been allocated to all devices connected to the single root port, and
- executing the legacy boot to boot the OS from the single boot device when the memory addresses have been allocated to all the devices connected to the single root port,
- when the executing the legacy boot of the OS fails, repeating the identifying, allocating, determining, and executing on another boot device among the boot devices.

7. The method of claim 6, further comprising:
- determining whether memory addresses with the bit width have been allocated to all devices included in the information processing apparatus when the information processing apparatus is turned on; and
- identifying the single root port when there exists a device to which a memory address with the bit width has not been allocated.

8. A non-transitory, computer-readable recording medium having stored therein a program for causing a computer to execute a procedure comprising performing a process including:
- identifying a single boot device among the boot devices and a single root port connected to the single boot device,
- allocating, as memory addresses to be used for memory mapped input and output, memory addresses with a bit width available during the legacy boot to devices connected to the identified single root port,
- determining whether the memory addresses have been allocated to all devices connected to the single root port, and
- executing the legacy boot to boot the OS from the single boot device when the memory addresses have been allocated to all the devices connected to the single root port,
- when the executing the legacy boot of the OS fails, performing the process on another boot device among the boot devices.

9. The non-transitory, computer-readable recording medium of claim 8, the procedure further comprising:
- determining whether memory addresses with the bit width have been allocated to all devices included in the information processing apparatus when the information processing apparatus is turned on; and
- identifying the single root port when there exists a device to which a memory address with the bit width has not been allocated.

\* \* \* \* \*